(12) United States Patent
Korus et al.

(10) Patent No.: US 8,807,465 B2
(45) Date of Patent: *Aug. 19, 2014

(54) HOSE PULL APPARATUS AND METHOD

(75) Inventors: Thomas J. Korus, Lindsay, NE (US); Wayne T. Jarecki, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 754 days.

This patent is subject to a terminal disclaimer.

(21) Appl. No.: 13/043,138

(22) Filed: Mar. 8, 2011

(65) Prior Publication Data

US 2012/0227835 A1 Sep. 13, 2012

(51) Int. Cl.
*B05B 3/18* (2006.01)
*B65H 75/36* (2006.01)
*B65H 75/44* (2006.01)

(52) U.S. Cl.
CPC ............ *B65H 75/4481* (2013.01); *B65H 75/36* (2013.01); *B65H 2701/33* (2013.01)
USPC ........... 239/734; 239/722; 239/747; 239/723; 239/1

(58) Field of Classification Search
CPC .... A01G 25/00; A01G 25/095; A01G 25/097
USPC ....................... 239/734, 747, 723, 1; 138/172
See application file for complete search history.

(56) References Cited

U.S. PATENT DOCUMENTS

| | | | | |
|---|---|---|---|---|
| 2,801,132 A | * | 7/1957 | Shuck | 239/736 |
| 4,346,843 A | * | 8/1982 | Long et al. | 239/745 |
| 4,350,295 A | * | 9/1982 | Gheen | 239/726 |
| 4,549,694 A | | 10/1985 | Davis et al. | |
| 5,080,290 A | * | 1/1992 | Ostrom | 239/724 |
| 5,356,080 A | * | 10/1994 | Chapman | 239/724 |
| 5,779,163 A | * | 7/1998 | Gunter | 239/734 |
| 6,021,818 A | * | 2/2000 | Horst et al. | 138/172 |
| 6,745,959 B2 | * | 6/2004 | Reid | 239/747 |
| 7,311,275 B2 | | 12/2007 | Korus | |
| 7,419,107 B1 | * | 9/2008 | Theilen | 239/741 |
| 2011/0127344 A1 | * | 6/2011 | Korus et al. | 239/1 |

FOREIGN PATENT DOCUMENTS

GB 2056239 * 3/1981 ............ A01G 25/09

* cited by examiner

*Primary Examiner* — Jason Boekmann
*Assistant Examiner* — Joel Zhou
(74) *Attorney, Agent, or Firm* — Hovey Williams LLP

(57) ABSTRACT

A hose-fed lateral move irrigation system and method that utilizes a pipe with a plurality of sprinklers attached to a wheeled cart that pulls a flexible-hose assembly therebehind using at least one onboard winch and travels laterally with the pipe and sprinklers relative to a field so that a sufficient amount of hose may be used to enable total automation of the system.

4 Claims, 16 Drawing Sheets

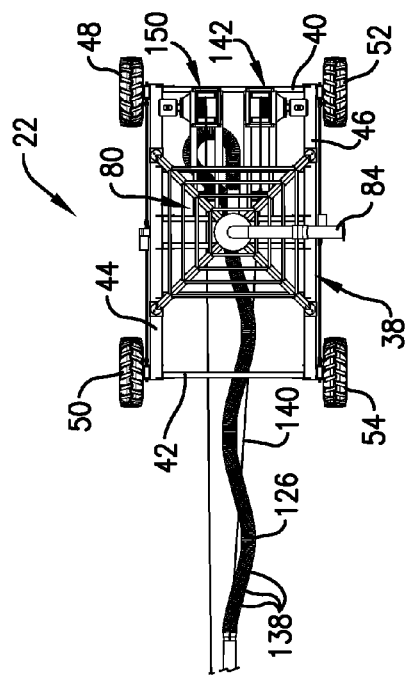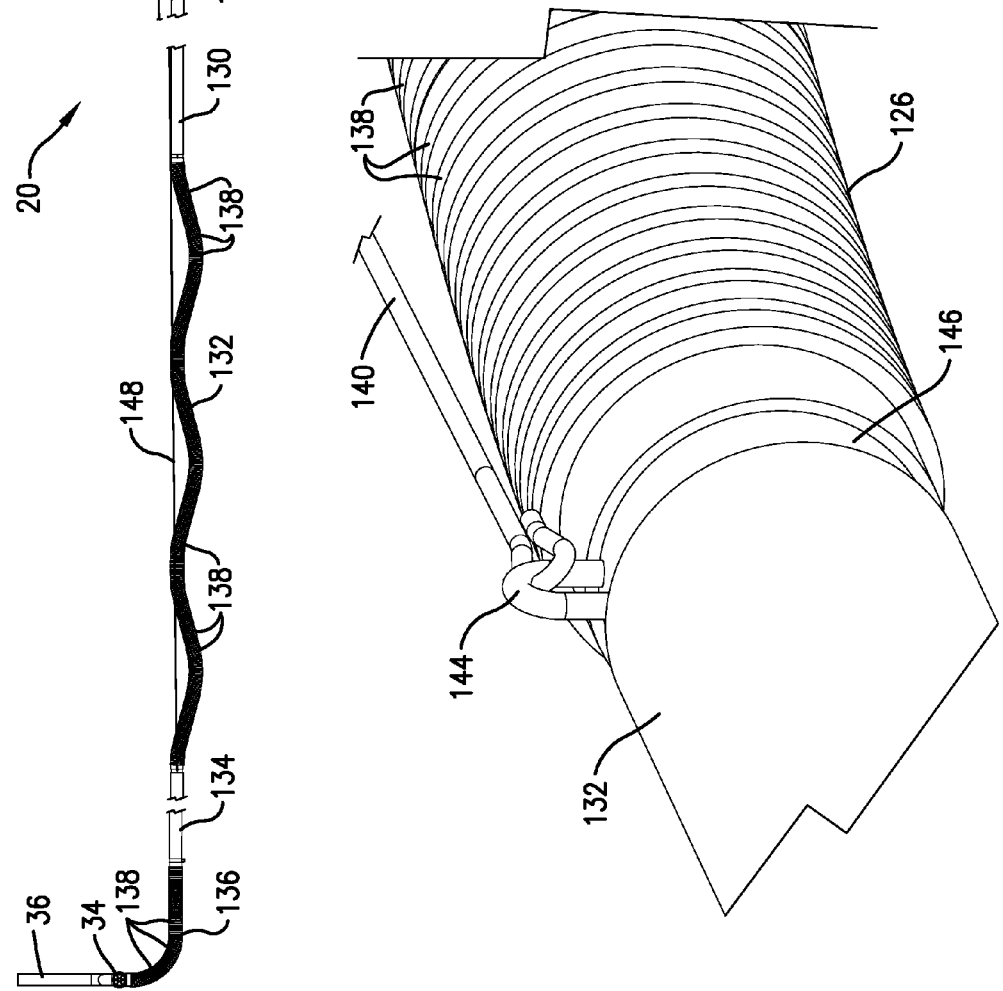

HOSE PULL APPARATUS AND METHOD

BACKGROUND

1. Field

The present invention relates generally to an agricultural irrigation system and method. More specifically, embodiments of the present invention concern a hose-fed lateral move irrigation apparatus, the apparatus being particularly suitable for use with the irrigation system and method.

2. Discussion of Prior Art

Crops are cultivated throughout the world in a wide variety of climates with different terrains and soils. It is desirable in many of these climates to artificially supplement the climate's natural precipitation via irrigation systems to ensure crops receive adequate water. Additionally, irrigation systems can be used to deliver fertilizers and chemicals to, among other things, promote healthy crop growth, suppress weeds, and protect crops from frost.

Common irrigation systems for use with crops cultivated in fields include overhead irrigation systems. In such systems, water may be hose-fed and/or pipe-fed to one or more "hydrants" located centrally within or adjacent to a field. Alternatively, water may be ditch-fed by routing water into a ditch that runs along and/or through a field.

The hydrants or ditches are connected by a hose to an overhead high-pressure sprinkler network, which includes an elevated, elongated pipe that is supported by a plurality of trusses. The pipe includes a plurality of sprinklers spaced generally along an entire length of the pipe and may extend downward to within approximately three ft. of the crops to enable distribution of water to the crops from above.

Common overhead sprinkler network types include center-pivot systems and lateral-move systems.

Center-pivot systems are ideal for use in fields having circular crop areas and generally include a hydrant located in the middle of each circular crop area. In such systems, an elevated, elongated pipe with sprinklers extends from a hydrant to an outer circumference of the circular crop area such that the systems may be driven in a circular pattern over the crops to deliver water thereto during rotation.

Lateral-move systems are ideal for use in square, rectangular, and irregular-shaped fields, for example, "L" shaped fields. Such systems generally include one or more hydrants located in and/or adjacent to a field and/or one or more ditches located along or through a field that are connected to an elevated, elongated pipe with sprinklers. Unlike the center-pivot system having a pipe with a stationary end, the pipe in a lateral-move system is connected to and extends from a movable cart designed to traverse up and down a cart path. The pipe may be locked at an angle perpendicular to the cart path and pivot at an end at the cart path, which is desirable if the cart path extends down the middle of a field to enable pivoting from one side of the cart path to the other with each pass along the cart path.

Lateral-move systems are connected to one hydrant at a time via a hose that is pulled behind the cart as it travels down a cart path until the hose becomes fully extended at which point the cart stops. Conventional carts have a limit to a length and diameter of hose that they are capable of pulling therebehind. Depending on a size of the field that the cart is employed, the length of the hose may not sufficiently enable the cart to travel down an entire length of the cart path while connected to the one hydrant via the hose. In such a scenario, one or more additional hydrants may be positioned along the cart path so that as the cart is traveling along the path and the hose becomes fully extended requiring the cart to stop, the hose may be disconnected from the one hydrant and connected to a next hydrant positioned further along the cart path so that the cart may continue along the cart path. Consequently, the number of hydrants along the cart path are determined by a length of the field and a length of the hose.

Conventional lateral-move systems include a dual manifold to allow hydrant changes to be done "on the run" so irrigation is not interrupted. However, when a conventional cart reaches an end of a hose and a hydrant change is desired, it is still necessary to signal the cart to stop at a predetermined distance and manually manipulate the hydrants and hoses. Particularly, it is necessary to connect a second hose to the next hydrant, activate the next hydrant, deactivate the one hydrant, disconnect a first hose from the one hydrant, and reactivate the cart so that it proceeds along the cart path.

Given that conventional hoses are typically very heavy, manipulating the hoses is time consuming and labor intensive. Replacing conventional hoses with lighter-weight hoses is not ideal because such are susceptible to kinking and blockage of fluid, which is more likely when attempting to run with low pressure to save energy. Additionally, lighter-weight hoses are easily damaged when run over by equipment, such as a tractor, which may occur from time to time.

SUMMARY

The following brief summary is provided to indicate the nature of the subject matter disclosed herein. While certain aspects of the present invention are described below, the summary is not intended to limit the scope of the present invention.

Embodiments of the present invention provide an irrigation system and method that does not suffer from the problems and limitations of conventional irrigation systems such as those set forth above.

The present invention provides, in its simplest form, a hose-fed lateral move irrigation system and method that utilizes a pipe with a plurality of sprinklers attached to a pulling element (e.g., a wheeled hose-pull cart, hose-pull tower, or the like) that pulls a hose assembly therebehind and travels laterally with the pipe and sprinklers relative to a field. The system and method has at least one onboard winch that is connected to and pulls the hose assembly in an alternating fashion relative to movement of the cart or movement of another onboard winch to displace the force required to pull the hose assembly therebetween, e.g., equally therebetween. In this manner, the system and method allows the cart to pull double the length of hose relative to a maximum length of hose that convention carts are able to pull, and enables completely-automated operation because the cart need only be connected to a single hydrant.

The aforementioned aspects are achieved in one aspect of the present invention by providing an irrigation system having a liquid conduit for the delivery of liquid. The system includes a movable cart having a plurality of wheels, a flexible-hose assembly connected to the movable cart and operable to provide a portion of the liquid conduit, and a hose-displacement assembly mounted on the movable cart, secured to the flexible-hose assembly, and operable to displace the flexible-hose assembly.

In some embodiments, the hose-displacement assembly may include at least one winch having a cable connected to the flexible-hose assembly at an attachment point along the flexible-hose assembly. The winch may be operable to pull the flexible-hose assembly relative to the cart. The flexible-hose assembly may include (i) a first flexible hose and (ii) a rigid hose having a first portion and a second portion connected to the movable cart in that order. A second flexible hose may be included to connect the rigid hose to a hydrant.

In some embodiments, the hose-displacement assembly may include a plurality of winches each having a cable connected to the flexible-hose assembly at attachment points that may be spaced from each other along the flexible-hose assembly. The plurality of winches may be operable to pull the flexible-hose assembly in an alternating manner and/or are operable to position their respective cables at about a center of the movable cart. The flexible-hose assembly may include a first flexible hose, a first rigid hose, a second flexible hose, and a second rigid hose that may be connected to the movable cart in that order. A third flexible hose may be included to connect the second rigid hose to a hydrant. The first flexible hose and the second flexible hose may be operable to expand and compress within an expansion-compression zone to enable movement of the cart without moving the first rigid hose and the second rigid hose, and/or independent alternating movement of the first rigid hose and the second rigid hose without any transfer of force between the first rigid hose and the second rigid hose.

The plurality of winches may include a first winch with a first cable having a length equal to a length of the first flexible hose and a second winch with a second cable having a length equal to a length of the first flexible hose and the first rigid hose. The cable of each of the plurality of winches may be selectively connectable to the winch. The plurality of winches may each have a reel of a sufficient diameter to effectively manipulate the hose assembly in a single rotation or less. The system may further include a cable-tensioning mechanism mounted on the movable cart to maintain a tension on each cable of the plurality of winches between the cable-tensioning mechanism and the plurality of winches.

The rigid hose may be connected to the cart via first and second cables. The first cable may be connected to the first portion of the rigid hose and have a length equal to a length of the flexible hose. The second cable may be connected to the second portion of the rigid hose and have a length equal to the length of the first flexible hose and a length of the first portion of the rigid hose. The first cable may be connected directly to the cart and the second cable may be indirectly connected to the cart via the winch such that the first and second cables enable (I) independent alternating movement of the first portion of the rigid hose and the second portion of the rigid hose with no transfer or minimal transfer of force therebetween, and (ii) movement of the cart without movement of the second portion of the rigid hose.

The aforementioned aspects may also be achieved by providing a method of traversing a field with an irrigation system having a liquid conduit. In one embodiment, the method includes the steps of providing a movable cart having a plurality of wheels, connecting a flexible hose assembly to the movable cart that is operable to provide a portion of the liquid conduit, and mounting a hose-displacement assembly to the movable cart that is secured to the flexible-hose assembly, and operable to displace the flexible-hose assembly.

The hose-displacement assembly used in embodiments of this method may include at least one winch having a cable connected to the flexible-hose assembly at an attachment point along the flexible-hose assembly. The winch may be operable to pull the flexible-hose assembly relative to the cart. The flexible-hose assembly may include (I) a flexible hose and (ii) a rigid hose having a first portion and a second portion connected to the movable cart in that order. The first cable may be connected to the first portion of the rigid hose and have a length equal to a length of the flexible hose, and the second cable may be connected to the second portion of the rigid hose and have a length equal to the length of the first flexible hose and a length of the first portion of the rigid hose. The first cable may be connected directly to the cart, and the second cable may be connected to the winch such that the first and second cables enable (I) independent alternating movement of the first portion of the rigid hose and the second portion of the rigid hose with no transfer or minimal transfer of force therebetween, and (ii) movement of the cart without movement of the second portion of the rigid hose.

The hose-displacement assembly used in embodiments of this method may include a plurality of winches each having a cable connected to the flexible-hose assembly at an attachment point. The attachment points may be spaced from each other along the flexible-hose assembly. The plurality of winches may be operable to pull the flexible-hose assembly in an alternating manner relative to each other. The flexible-hose assembly may include a first flexible hose, a first rigid hose, a second flexible hose, and a second rigid hose connected to the movable cart in that order. The first flexible hose and the second flexible hose may each define an expansion-compression zones and may each be operable to expand and compress within its expansion-compression zone to enable (I) movement of the cart without movement of the rigid hose, and (ii) independent alternating movement of the first rigid hose and the second rigid hose without any transfer of force therebetween.

The plurality of winches may include a first winch with a first cable having a length equal to a length of the first flexible hose and a second winch with a second cable having a length equal to a length of the first flexible hose and the first rigid hose. The rigid hose may be connected to the cart via first and second cables. The method may further include the step of maintaining a tension on the cable of the winch between a cable-tensioning mechanism and the winch.

Additional aspects, advantages, and utilities of the present invention will be set forth in part in the description which follows and, in part, will be obvious from the description, or may be learned by practice of the general invention.

BRIEF DESCRIPTION OF THE DRAWING FIGURES

Embodiments of the present invention are described in detail below with reference to the attached drawing figures, wherein:

FIG. 7 is top plan view of the cart illustrated in FIG. 1, illustrating the rigid hoses and the flexible hoses substantially extended FIG. 8 is an enlarged rear right-side perspective view of a coupling assembly illustrated in FIG. 1 to connect a cable to a rigid hose;

Figure 1:
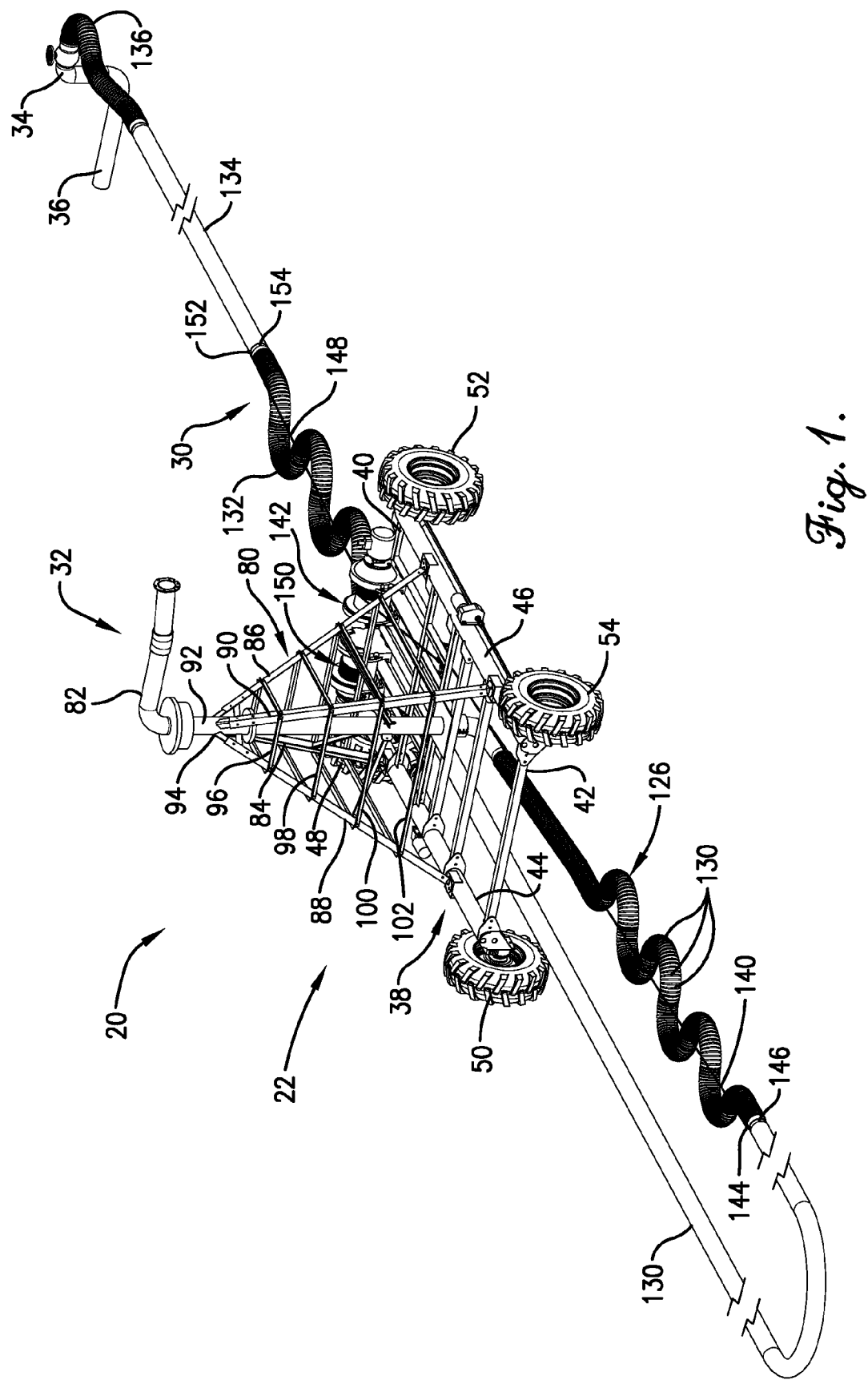
FIG. 1 is a rear right side perspective view of a hose-fed lateral move irrigation system in accordance with an exemplary embodiment of the present invention, illustrating a cart connected to a hydrant via rigid hoses and flexible hoses.
Figure 2:
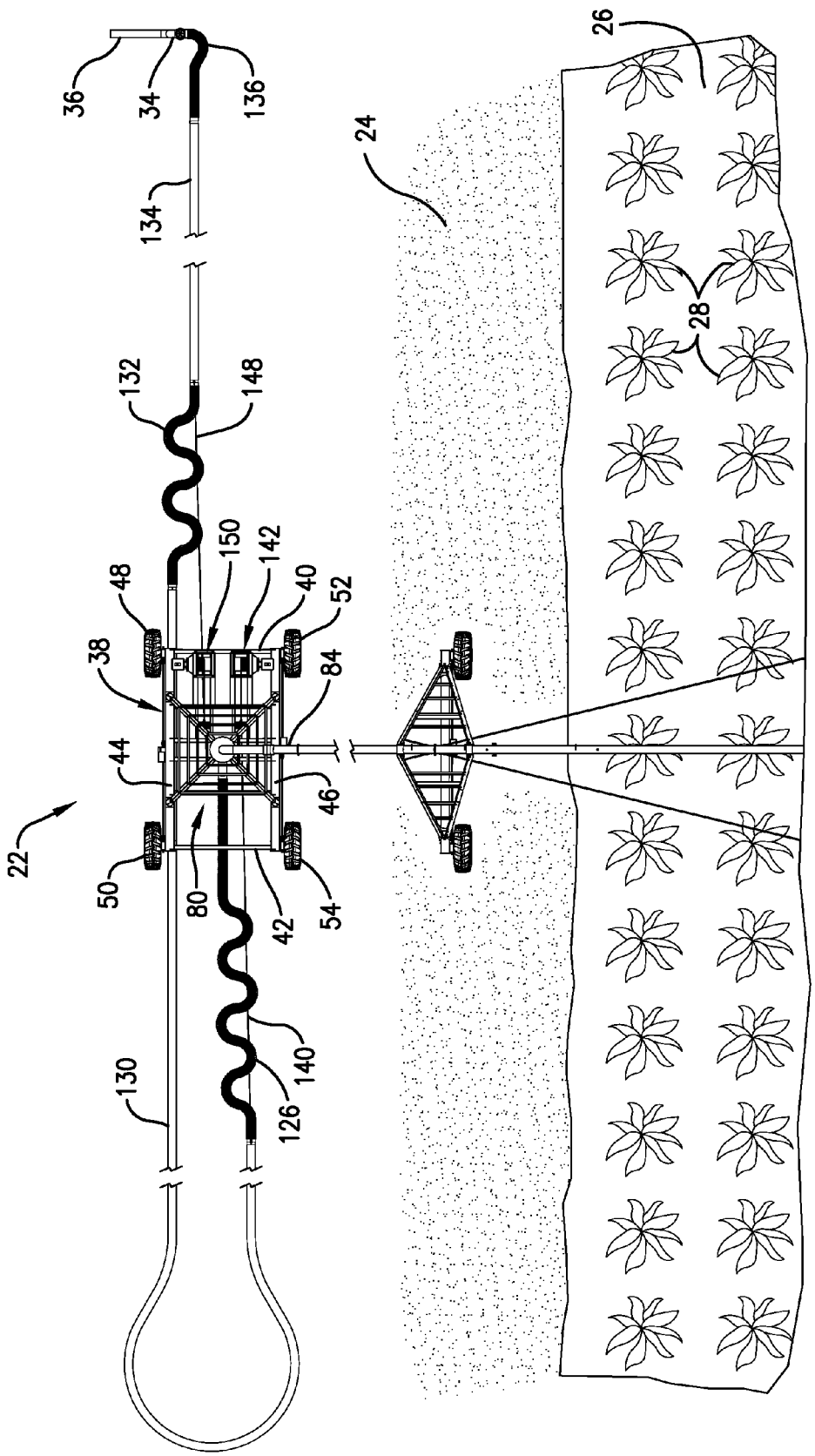
FIG. 2 is a top plan view of a hose-fed lateral move irrigation system illustrated in FIG. 1, illustrating the cart connected to the hydrant via the rigid hoses and the flexible hoses.
Figure 3:
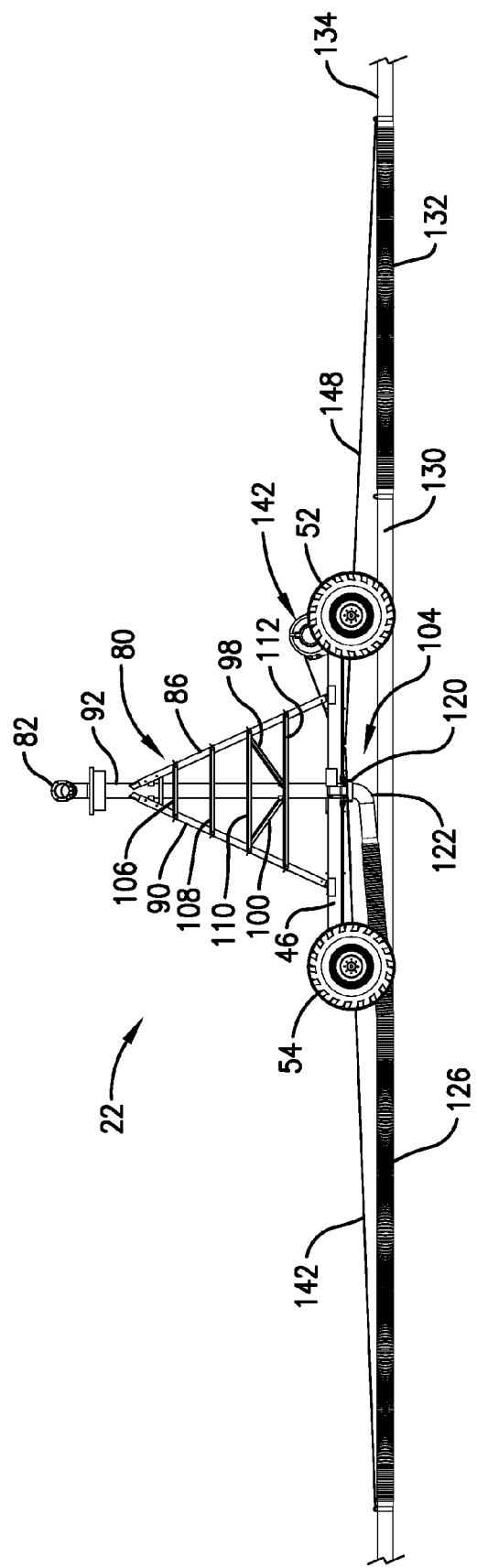
FIG. 3 is a right side view of a hose-fed lateral move irrigation system illustrated in FIG. 1, illustrating the cart connected to the hydrant via the rigid hoses and the flexible hoses.

The drawing figures do not limit the present invention to the specific embodiments disclosed and described herein. The drawings are not necessarily to scale, emphasis instead being placed upon clearly illustrating the principles of the illustrated embodiment.

DETAILED DESCRIPTION OF THE EXEMPLARY EMBODIMENT

The present invention is susceptible of embodiment in many forms. While the drawings illustrate, and the specification describes, certain embodiments of the invention, it is to be understood that such disclosure is by way of example only. The principles of the present invention are not limited to the particular disclosed embodiments.

With initial reference to FIGS. 1-5, a hose-fed lateral move irrigation apparatus 20 is illustrated and broadly includes a traveling cart 22 that traverses up and down a cart path 24 that is located adjacent to a field 26 with crops 28 to be irrigated. It is foreseen that another pulling vehicle or structure could be utilized instead of the cart 22 without deviating from the scope of the present invention (e.g., a hose-pull tower). The cart 22 generally includes a fluid-receiving section 30 and a fluid-dispensing section 32.

The fluid-receiving section 30 is connected to a fluid source (not illustrated) via a hydrant 34 and an underground pipe 36. The fluid source may be a well, pond, water tank, chemical tank, and/or other like source of fluids and/or solids suspended in fluids including fertilizers and pesticides (hereinafter "fluids") and are deliverable to the crops 28 in the field 26 via the fluid-dispensing section 32 that receives the fluids from the fluid-receiving section 30

The cart 22 is formed by a rectangular steel or other suitable material (e.g., aluminum) frame assembly 38 that includes parallel front and rear rails 40, 42 connected by parallel left and right side rails 44, 46 that are welded, bolted, or otherwise connected together. The left and right side rails 44, 46 are respectively connected to a pair of left-side wheels 48, 50 and a pair of right-side wheels 52, 54.

Running perpendicular to and secured to the side rails 44, 46 are a plurality of interior support rails 56, 58, 60, 62. Running parallel to the side rails 44,46 and respectively secured to interior support rails 60, 62, and interior support rail 62 and front rail 40 are a plurality of interior support rails 64, 66, 68, 70 and 72, 74, 76, 78. The interior support rails 56, 58, 60, 62, 64, 66, 68, 70, 72, 74, 76, 78 are connected via welding or other suitable means for attachment (e.g., bolting) and advantageously increase the structural integrity of the cart 22 and provide support for a triangular tower assembly 80.

The tower assembly 80 supports an overhead fluid-distribution pipe 82 of the fluid-dispensing section 32, which includes a plurality of truss sections (not illustrated) that are supported by a plurality of mobile towers (not illustrated). The distribution pipe 82 extends outwardly from the cart 22 in a lateral direction thereto and includes a plurality of sprinklers (not illustrated) located along each of the plurality of sections of the distribution pipe 82 to communicate the fluid to the crops 28 from an ideal height above the crops 28. Details of exemplary truss sections, mobile towers, and sprinklers are shown in U.S. Pat. Nos. 4,549,694 and 7,311,275, which are hereby incorporated by reference in their entireties.

The tower assembly 80 supports the distribution pipe 82 via a pair of front support members 84, 86 and a pair of rear support members 88, 90 that connect to a substantially vertical riser conduit 92 that communicates with and extends downward from the distribution pipe 82. The support members 84, 86, 88, 90 connect the riser conduit 92 to the frame assembly 38 of the cart 22 so that the distribution pipe 82 is secured overhead with respect to the cart 22. The front support members 84, 86 and rear support members 88, 90 are connected to the distribution pipe 82 at upper ends thereof about a first common radius 94 of the riser conduit 92 and to the left and right rails 52, 54 at lower ends thereof that are spaced from each other to form a triangular configuration. In this manner, the support members 84, 86, 88, 90 extend upwardly from the frame assembly 38 of the cart 22 to converge at the first common radius 94 of the riser conduit 92 to secure the distribution pipe 82 overhead with respect to the cart 22. The riser conduit 92 receives additional support from arms 96, 98, 100, 102 that respectively depend from the front and rear support members 84, 86, 88, 90 to a second common radius 104 on the riser conduit 92.

Figure 4:
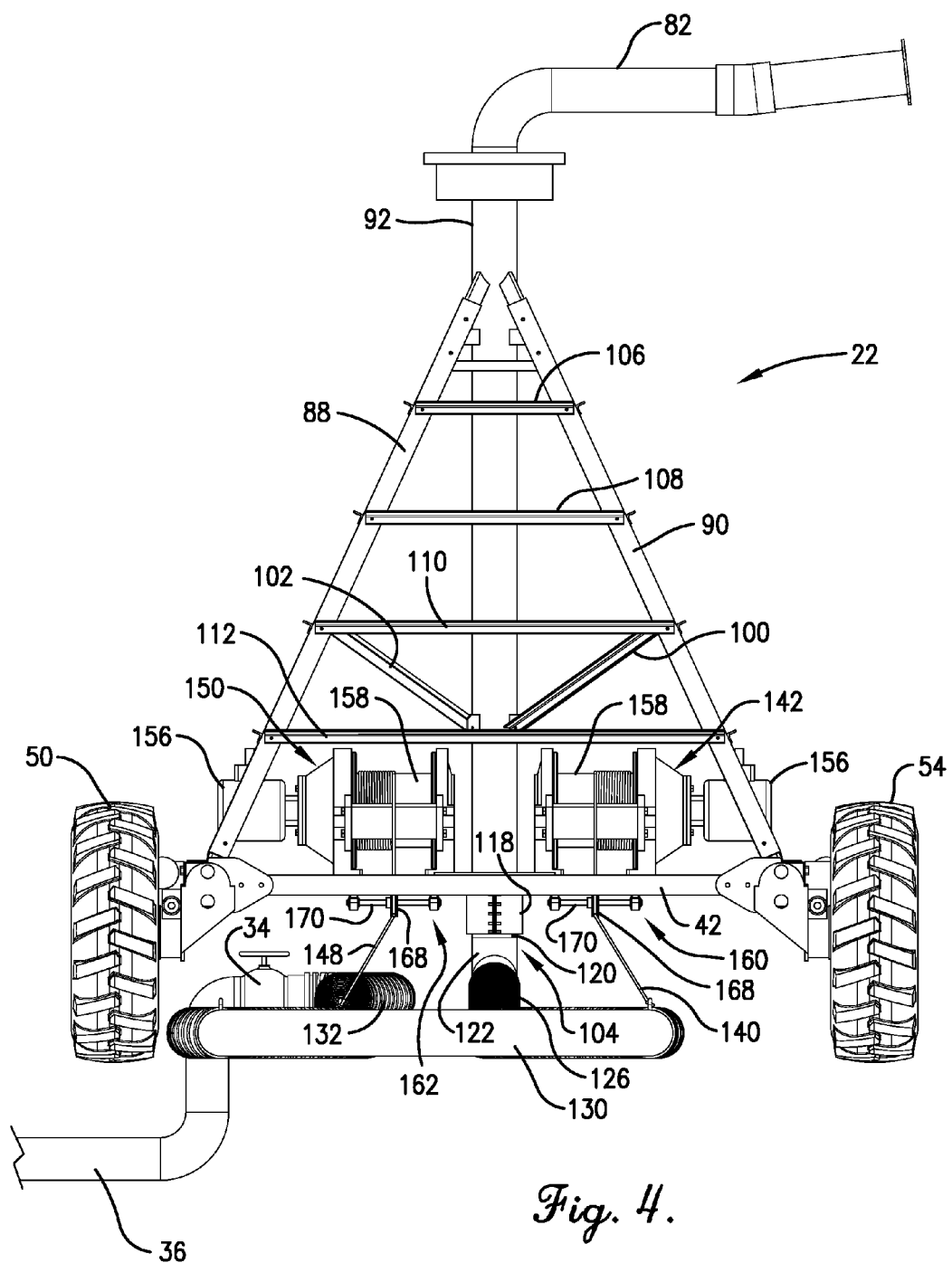
FIG. 4 is a rear view of a hose-fed lateral move irrigation system illustrated in FIG. 1, illustrating the cart connected to a hydrant via the rigid hoses and the flexible hoses.
Figure 5:
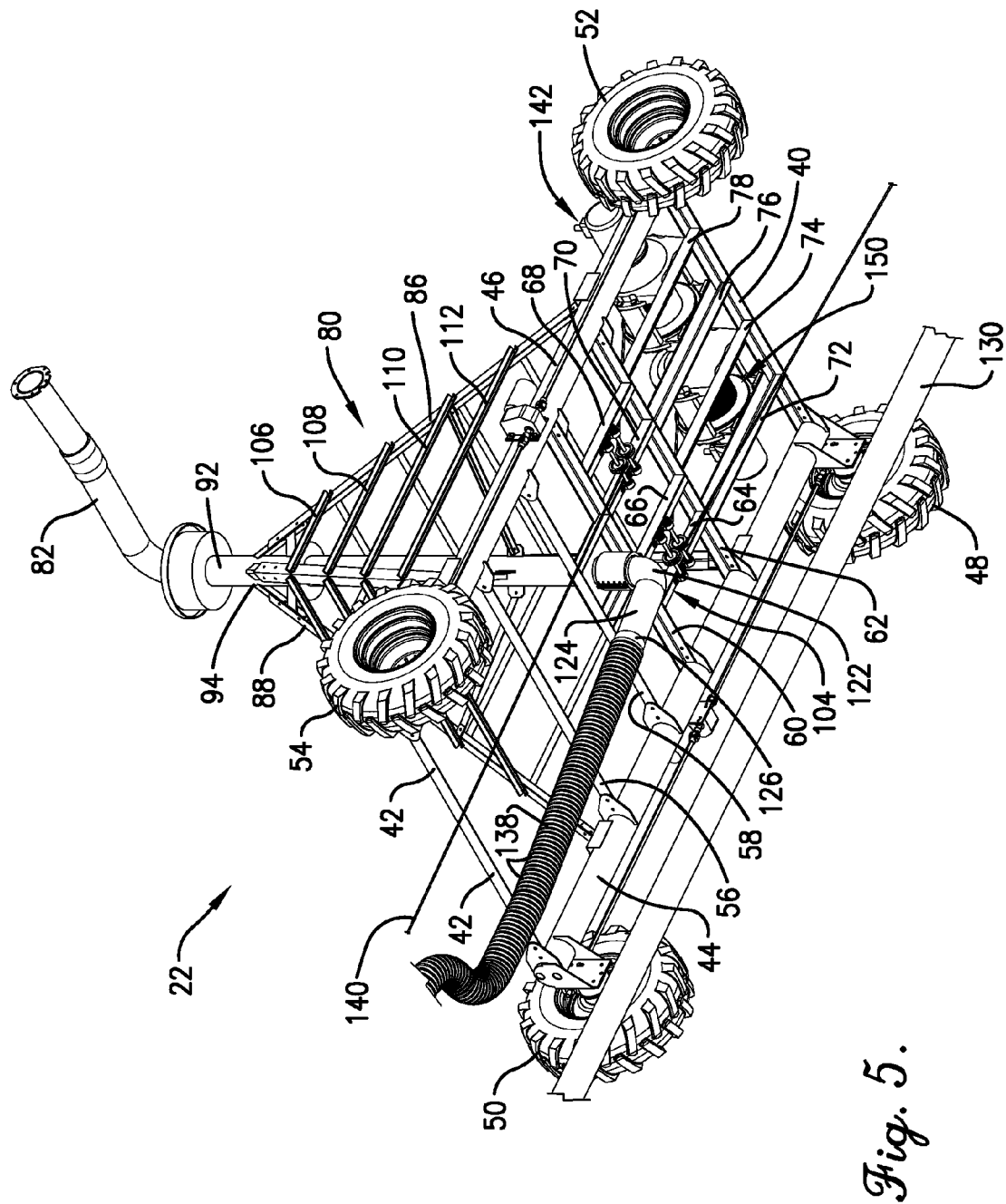
FIG. 5 is a bottom right-side perspective view of the cart illustrated in FIG. 1, illustrating cable-tensioning mechanisms.
Figure 10:
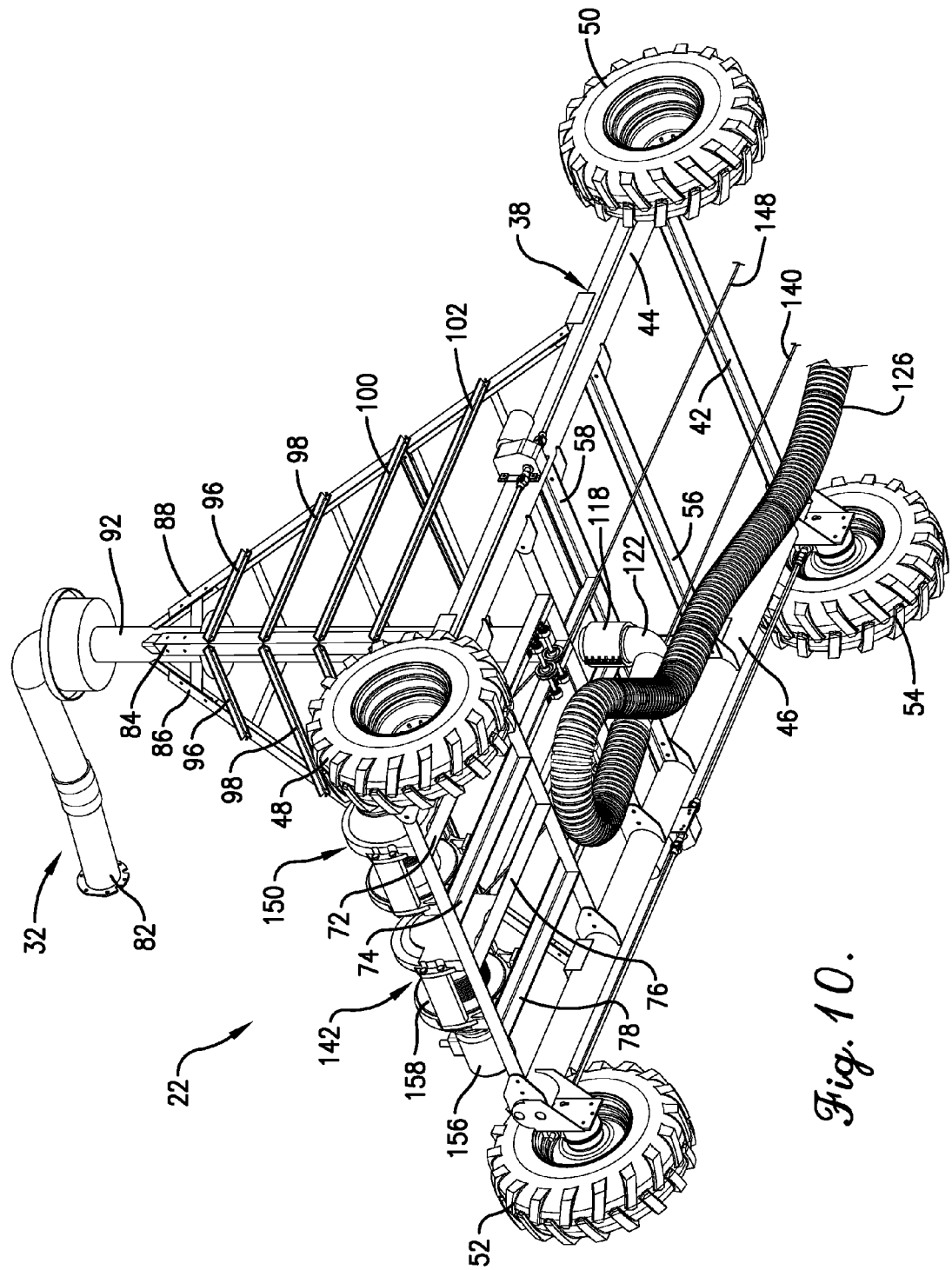
FIG. 10 is a bottom left-side perspective view of the cart illustrated in FIG. 1, illustrating a coupling assembly to connect the cart to a flexible hose.

Each of the support members 84, 86, 88, 90 have cross members 106, 108, 110, 112 that extend between and connect adjacent support members 84, 86, 88, 90 to increase the structural integrity of the tower assembly 80. As illustrated in FIGS. 4 and 10, cross members 106, 108, 110, 112 extend generally horizontal between the support members support members 84, 86, 88, 90. In the exemplary embodiment, the cross members 106, 108, 110, 112 are connected to the support members 84, 86, 88, 90 via screws with lock nuts (not illustrated). Any means for attachment including welding could be used to connect the cross members 106, 108, 110, 112 to the support members 84, 86, 88, 90 without departing from the scope of the present invention.

The frame assembly 38 of the cart 22 could also assume a number of configurations without departing from the scope of the present invention. For example, the wheels 48, 52 and wheels 50, 54 may be respectively connected to front and rear rails 40, 42 and/or the interior support rails 56, 58, 60, 62, 64, 66, 68, 70, 72, 74, 76, 78 may be connected perpendicular or parallel to the side rails 44, 46 without departing from the scope of the present invention.

On an underside of the distribution pipe 82 and in communication therewith is a flexible-hose attachment assembly 114 that has is secured on a platform 116 between interior support rails 58, 60, as illustrated in FIGS. 9-12. The hose-attachment assembly 114 communicates fluid to the distribution pipe 82 through the riser conduit 92 and includes a clamp 118 to maintain the hose-attachment assembly in a secured configuration.

Below the clamp 118 is a pivot point 120 that permit swiveling of an elbow coupler 122 located below the pivot point 120. The coupler 122 is angled downward with respect a horizontal plane defined by the frame 28 at an angle of approximately fifteen to forty-five degrees to facilitate swiveling of the coupler 122 when it is subjected to a force.

The coupler 122 swivels 180 degrees in the exemplary embodiment with a center point of swivel defined by the coupler 122 when swiveled to face the left or right rails 44, 46 of the cart 22, and furthest-most points of swivel defined by the coupler 122 when swiveled to face the front and rear rails 40, 42 of the cart 22. The coupler 122 may also be limited to swivel from only one degree or to any degree up to 360 degrees, rotate in one or both directions perpetually, or be fixed in a single direction, e.g., fixed at the center point, to fit any application of the hose-fed lateral move irrigation apparatus 20 without departing from the scope of the present invention. The coupler 122 includes a nozzle tip 124 that receives a first relatively soft or flexible hose 126 that extends around a circumference of the nozzle tip 124. It is foreseen that the coupler 122 may include a circumferential ridge (not illustrated) at or near an end of the nozzle tip 124 to provide a water-tight seal between the hose-attachment assembly 114 and the first flexible hose 126 when the end of the first flexible hose 126 is fitted there around and extends past the circumferential ridge.

Figure 6:
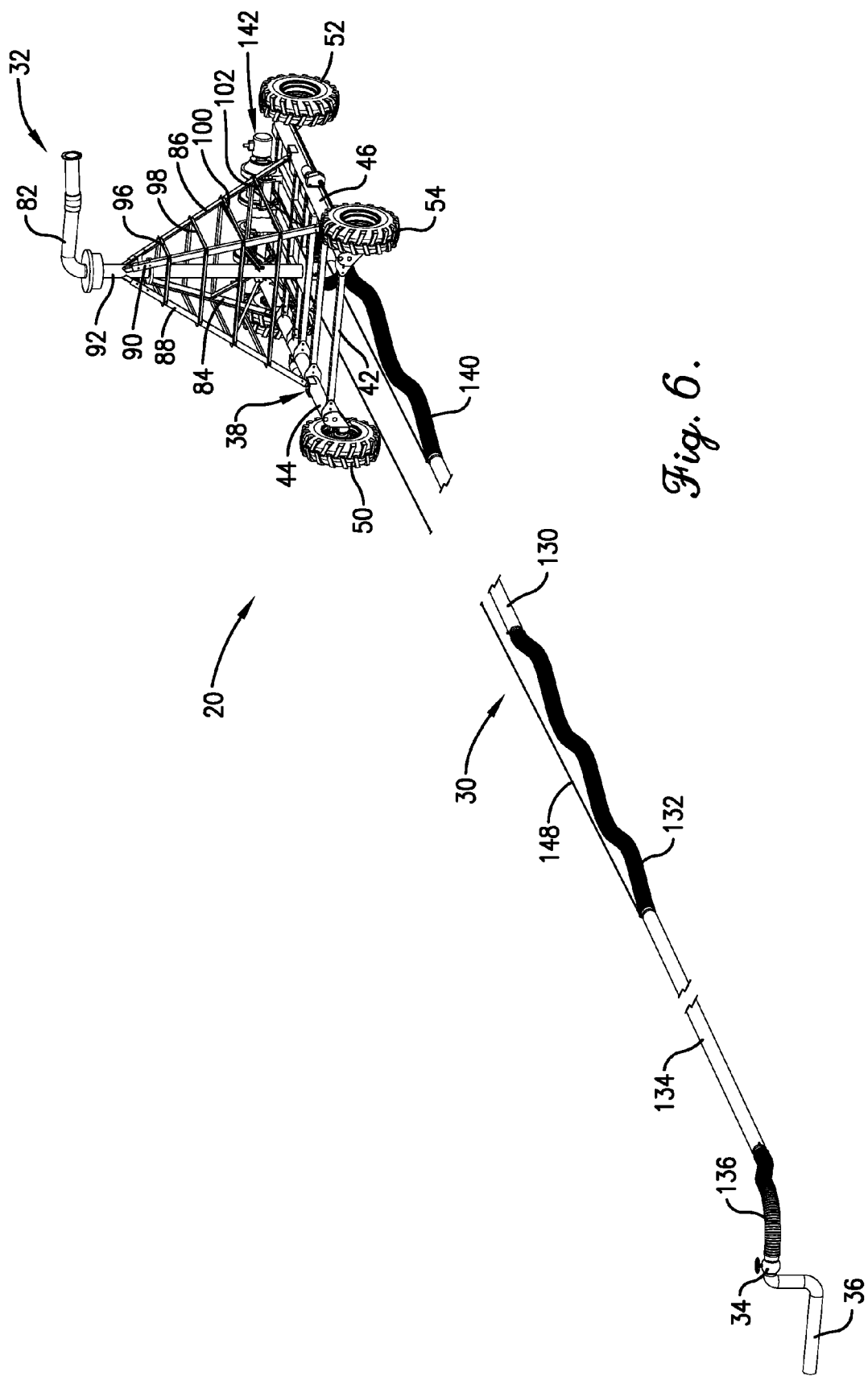
FIG. 6 is a rear right side perspective view of the cart illustrated in FIG. 1, illustrating the rigid hoses and the flexible hoses substantially extended.

Turning to FIGS. 6 and 7, the fluid receiving section 30 is illustrated in its entirety and illustrates the first flexible hose 126 connected to a first relatively hard or rigid hose 130, the first rigid hose 130 connected to a second flexible hose 132, the second flexible hose 132 connected to a second rigid hose 134, the second rigid hose 134 connected to a third flexible hose 136, and the third flexible hose 136 connected to the hydrant 34. The first and second rigid hoses 130, 134 receive the first, second, and third flexible hoses 126, 132, 136 around circumferential ends thereof. It is foreseen that the first and second rigid hoses 130, 134 may include circumferential ridges (not illustrated), as previously discussed, at or near ends thereof to provide water-tight seals therebetween.

The first, second, and third flexible hoses 126, 132, 136 are of the same material; a material having a minimum-bend diameter that is less than a width of the cart 22. In the exemplary embodiment, the first, second, and third flexible hoses 126, 132, 136 are made of flexible, reinforced rubber having a two ft. minimum-bend diameter. However, the first, second, and third flexible hoses 126, 132, 136 may be of any material of a minimum-bend diameter less than a width of the cart 22. Each of the first, second, and third flexible hoses 126, 132, 136 includes a plurality of ribs 138 along an entire length thereof to provide increased strength and durability for the first flexible hose 126. Additionally, the material of the flexible hoses 126, 132, 136 combined with the ribs 138 provide a degree of expansion and compression of the flexible hoses 126, 132, 136. Thus, each of the flexible hoses 126, 132, 136 have an expansion-compression zone. The size of the expansion-compression zone is defined by hose length with longer hoses having a larger zone and shorter hoses having a smaller zone.

The first and second rigid hoses 130, 134 are made of a material with sufficient strength and durability to transport a large amount of fluid at a sufficient flow rate, withstand damage by rodents and the like, and be drug behind the cart 22 and occasionally run over by the cart 22 and other heavy-duty equipment such as tractors and the like. In the exemplary embodiment, the first and second rigid hoses 130, 134 are made of polyethylene tubing having a diameter of 6.625 inches, which approximately provides a flow rate of 450 g.p.m., a capacity of five ft./sec., and a fourteen ft. minimum-bend diameter. However, the first and second rigid hoses 130, 134 could be made of any like material of sufficient strength and size, so long as the capacity of the first and second rigid hoses 130, 134 do not exceed a velocity of five ft./sec. as such increases the likelihood of water hammer and excessive friction losses.

Turning now to FIGS. 7 and 8, extending down the entire length of the first flexible hose 126 is a first external cable 140, which is connected at one end to a first wench 142 that is mounted on the cart 22 and at the other end to an eyelet 144 that is welded to a collar 146 that surrounds an end of the first rigid hose 130 and is rotatable thereabout. Extending down the entire length of the first flexible hose 126 and the first rigid hose 130 is a second external cable 148. Similar to the first external cable 140, the second external cable 148 is connected at one end to a second winch 150 that is mounted on the cart 22 and at the other end to an eyelet 152 that is welded to the collar 154 that surrounds an end of the second rigid hose 134. In this manner, the cart 22 is operable to displace or pull the first and second rigid hoses 130, 134 without any transfer of pull force from the first and second flexible hoses 128, 132 to the first and second flexible hoses 126, 132, which is instead transferred directly to the cart 22 vie the first and second external cables 140, 148.

The first and second external cables 140, 148 are made of steel to provide sufficient strength and durability to tolerate exposure to the elements. However, any like material of sufficient strength and durability could be utilized.

The collars 146, 154 may be respectively rotatable about the first and second rigid hoses 130, 134 to expose eyelets 144, 152 that are respectively fastened to the collars 146, 154. In this manner, connections between the first and second external cables 140, 148 and the first and second rigid hoses 130, 134 are facilitated without requiring substantial movement of the first and second rigid hoses 130, 134. The eyelets 144, 152 may also be used to move the first and second rigid hoses 130 via equipment capable of moving the first and second rigid hoses 130, 134, for example, using a tractor (not illustrated) to stage the first and second rigid hoses 130, 134 in preparation for use with the lateral-move apparatus 20.

Figure 9:
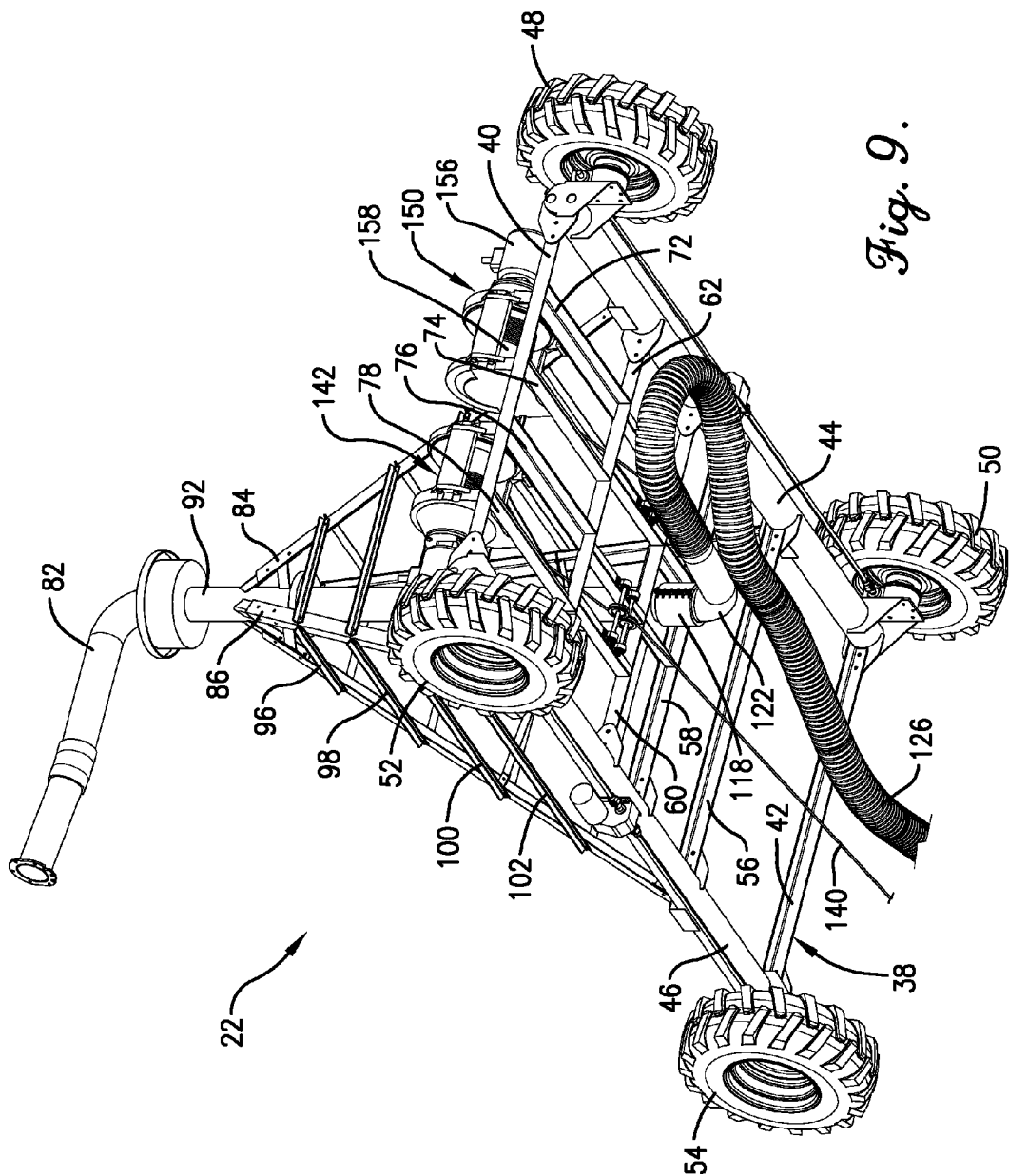
FIG. 9 is a bottom right-side perspective view of the cart illustrated in FIG. 1, illustrating a coupling assembly to connect the cart to a flexible hose.
Figure 11:
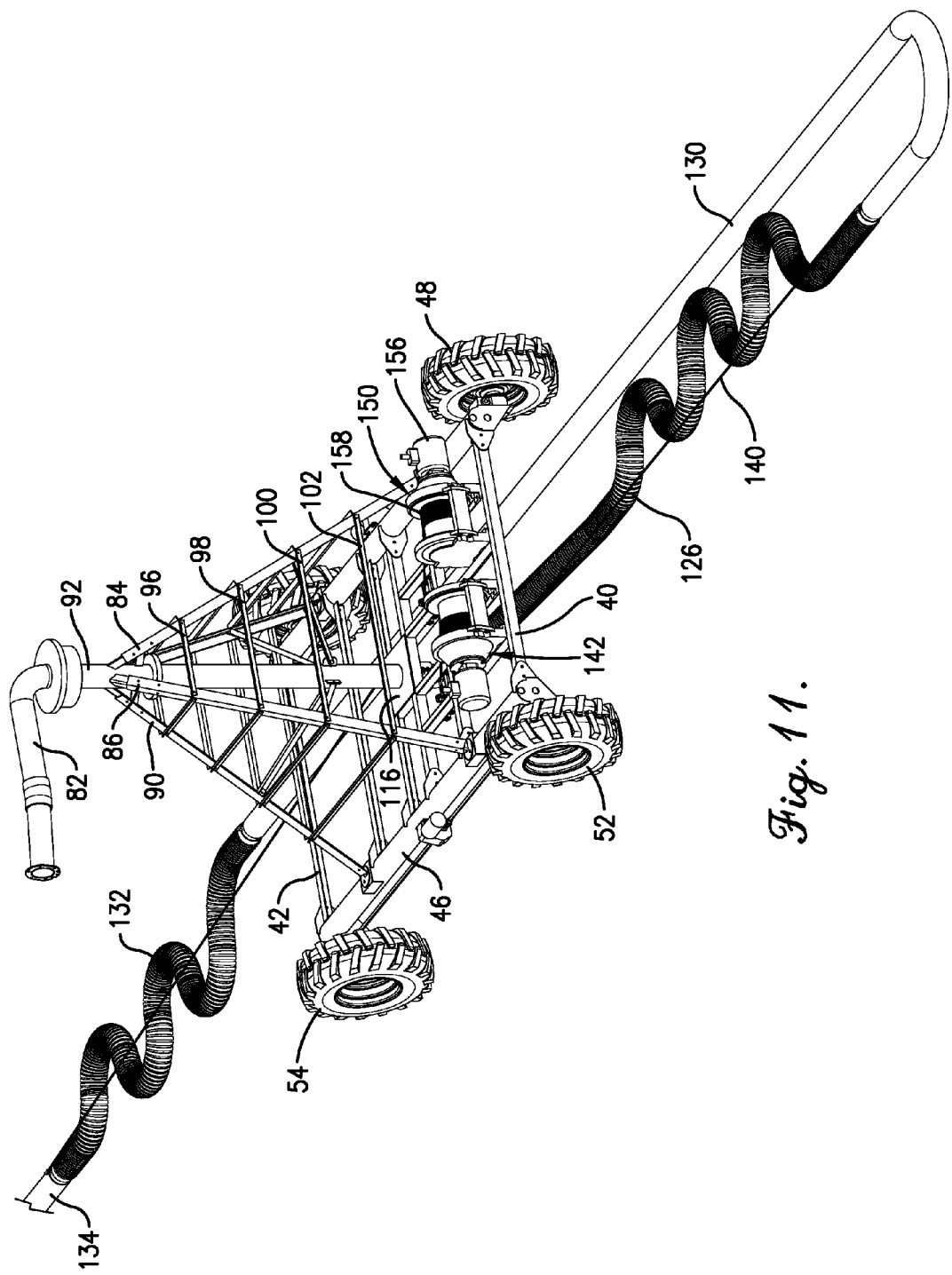
FIG. 11 is a front right side perspective view of the cart illustrated in FIG. 1, illustrating the rigid hoses and the flexible hoses.
Figure 12:
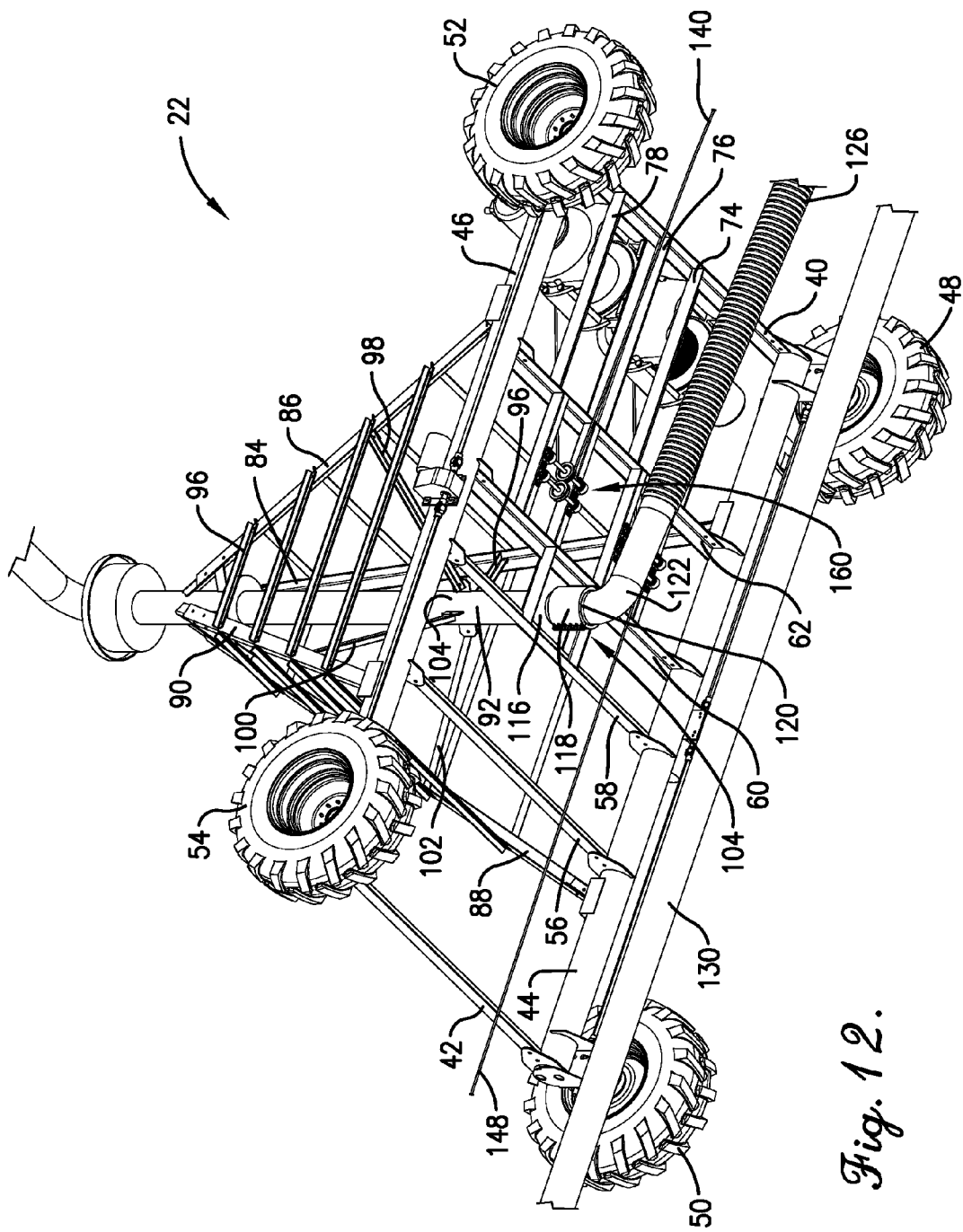
FIG. 12 is a bottom right-side perspective view of the cart illustrated in FIG. 1, illustrating cable-tensioning mechanisms.

The first and second winches 142, 150 are respectively mounted to interior support rails 72, 74 and 76, 78, of the frame assembly 38 as illustrated in FIGS. 9, 10, and 11. In the exemplary embodiment, the first and second winches 142, 150 are simple, identical winches that each include a center-drive motor 156 connected to a planetary gearbox (not illustrated) with a reel 158 to enable rotation of the reel 158 when the motor 156 is idle yet provide some braking so that the first and second external cables 140, 148 lie straight. Additionally, a brake (not illustrated) is provided between the gearbox and motor 156 to secure the reel 158 in a fixed position when the motor 156 is stopped to prevent backlash from the first and/or and second external cables 140, 148 due to tension in the first and/or second external cables 140, 148. It is foreseen that one or both of the first and second winches 142, 150 may include a solenoid and/or clutch, and be sized differently depending on the application of the present invention.

In the exemplary embodiment, each reel 158 of the first and second winches 142, 150 is equally sized and of a diameter that is capable of use, as discussed below, with only a single revolution in either direction. It is foreseen, however, that each reel 158 may be of any size and/or sized different with respect to the other depending on the application of the present invention.

The first and second winches 142, 150 may be independently controlled by a controller (not illustrated) mounted on the frame assembly 38 that activates and deactivates the first and second winches 142, 150 alternatively and/or simultaneously and manually or automatically, e.g., according to a program and/or using a run switch secured to the first and second external cables 140, 148 and/or a trip target, depending on the application of the present invention.

The first and second external cables 140, 148 are respectively connected to and selectively wound around each reel 158 of the first and second winches 142, 150. The first and second external cables 140, 148 extend from each reel 158 of the first and second winches 142, 150 and respectively pass through first and second pulley assemblies 160, 162, as illustrated in FIGS. 9, 10, 12, and 14. The first and second pulley assemblies 160, 162 each include a first wheel 164 on a first axle 166 that is aligned with a second wheel 168 on a second axle 170. The first and second wheels 164, 168 are grooved to accommodate one of the first and second cables 140, 148 therein, and are aligned in series so that each of the first and second cables 140, 148 are trapped between the first and second wheels 164, 168. In this manner, the first and second pulley assemblies 160, 162 respectively maintain a tension on a portion of the first and second external cables 140, 148 that is between the first and second pulley assemblies 160, 162 and the first and second winches 142, 150, which prevents inadvertent disengagement of the external cables 140, 148 from the first and second winches 142, 150.

The third flexible hose 136 extends to and is connected to the hydrant 34, the underground pipe 36, and ultimately the fluid source (not illustrated). The hydrant 34 is selectively activated via a valve (not illustrated) and is centrally located in the cart path 24 in the exemplary embodiment so that the cart 22 may pass over via straddling the hydrant 34, as illustrated in FIGS. 2, 7, 11 and 13. It is foreseen, however, that the hydrant 34 may be located adjacent to the cart path 24.

The location of the hydrant 34 defines a length of the combined flexible and rigid hoses 126, 130, 132, 134, 136. For example, if the hydrant 34 is placed in the middle of the field 26, the length of the combined flexible and rigid hoses 126, 130, 132, 134, 136 may be approximately equal to half of the field 26. As such, if the field 26 is 2000 ft., the combined flexible and rigid hoses 126, 130, 132, 134, 136 is 1000 ft. In this manner, the flexible and rigid hoses 126, 130, 132, 134, 136 are fully extended and straight when the cart 22 reaches an end of the field 26, which decreases the likelihood of kinking.

For purposes of describing the present invention 20 in use, the course of the cart 22 will be limited to a simple forward and backward traverse along the cart path 24 without any pivoting of the fluid-dispensing section 32. It is foreseen, however, that the cart 22 may accommodate an unlimited variety of courses depending on a field to be irrigated.

In use, the cart 22 is positioned in a starting position at an end of the cart path 24 with the hydrant 34 spaced therefrom, e.g., at a center of the cart path 24. The flexible and rigid hoses 126, 130, 132, 134, 136 are aligned between the cart 22 and the hydrant 34. The first and second rigid hoses 130, 134 may be aligned using a tractor or other vehicle (not illustrated). To facilitate alignment of the first and second rigid hoses 130, 134, the collar 146 with eyelet 144 of each of the first and second rigid hoses 130, 134 may be utilized, which may require rotation of the collar 146 to expose the eyelet 144. Once the first and second rigid hoses 130, 134 are staged, the first flexible hose 126 is connected to the first rigid hose 130 and the coupler 122, the second rigid hose is connected to the first rigid hose 130 and the second rigid hose 134, and the third flexible hose 136 is connected to the second rigid hose 134 and the hydrant 34, which closes a circuit between the fluid-receiving section 30 and the fluid-dispensing section 32.

The hydrant 34, which has a shutoff valve (not illustrated) operable to activate and deactivate a flow of fluid, is activated so that fluid travels through the fluid-receiving section 30 and fluid-dispensing section 32 to the crops 28 for irrigation thereof. The cart 22 then begins to travel forward in a direction of the hydrant 34 and over the flexible and rigid hoses 126, 130, 132, 134, 136 from a starting point at a predetermined rate with the distribution pipe 82 irrigating crops 28 adjacent to the cart 22. The cart 22 travels forward for a predetermined distance while the first flexible hose 126 expands and the flexible and rigid hoses 130, 132, 134, 136 remain unaffected and at rest. In the exemplary embodiment, the predetermined distance is in the range of six inches to ten feet and is preferably one foot, which is programmed into a guidance system with G.P.S. (not illustrated). The guidance system enables the cart 22 to follow the cart path 24 and stop at the predetermined distances using an antenna (not illustrated) mounted on the cart 22 that communicates with a wire (not illustrated) that extends along and is aligned with the cart path.

When the cart 22 has traveled the predetermined distance, the cart 22 stops and the first winch 142 activates to drag the first rigid hose 130 toward the cart 22 the same distance the cart 22 just traveled, i.e., the predetermined distance, which causes the first flexible hose 126 to compress. When the first rigid hose 130 has been dragged the predetermined distance, the first winch 142 deactivates to end a travel cycle of the lateral-move apparatus. The cart 22 then travels forward the predetermined distance and the travel cycle is repeated until the cart 22 reaches a predetermined point along the path 24 where the second flexible hose 132 begins to expand.

After the cart 22 passes the predetermined point and second flexible hose 132 becomes expanded, the cart 22 stops after completing the travel cycle as discussed above. After the first winch 142 performs its operation as discussed above, the second winch 150 activates to drag the second rigid hose 134 toward the cart 22 the same distance the cart 22 just traveled, i.e., the predetermined distance, which causes the second flexible hose 132 to compress. In this manner, the first and second flexible hoses 126, 132 independently utilize their expansion-compression zone, as previously discussed, to enable movement of the cart 22 without movement of the first and second rigid hoses 130, 134.

The first and second winches 142, 150 perform their operations while the cart 22 anchors the cart 22 in a fixed position on the cart path 24. Thus, the maximum size of the first and second rigid hoses 130, 134 is determined by the ability of the cart 22 to maintain its position as the first and second winches 142, 150 alternately operate. The first and second winches 142, 150 alternate to perform their operations so that the pull force of the first and second rigid hoses 130, 134 is exerted upon the cart 22 independent from each other, which enables the cart 22 to pull larger first and second rigid hoses 130, 134.

It is foreseen that weights may be added to the cart 22 to increase the anchor ability of the cart 22 by increasing the weight of the cart 22.

Figure 13:
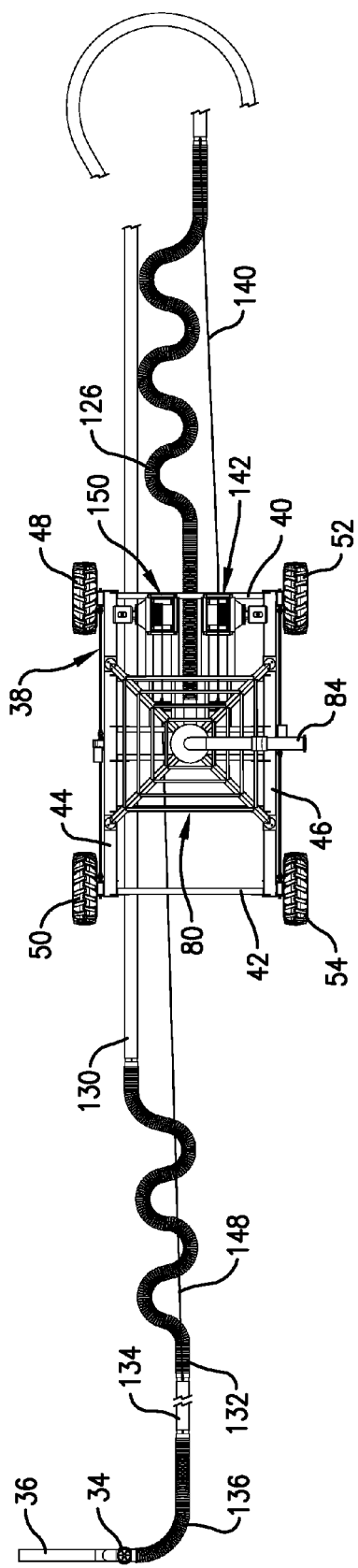
FIG. 13 is a top plan view of a hose-fed lateral move irrigation system illustrated in FIG. 1, illustrating the cart connected to the hydrant via the rigid hoses and the flexible hoses.
Figure 14:
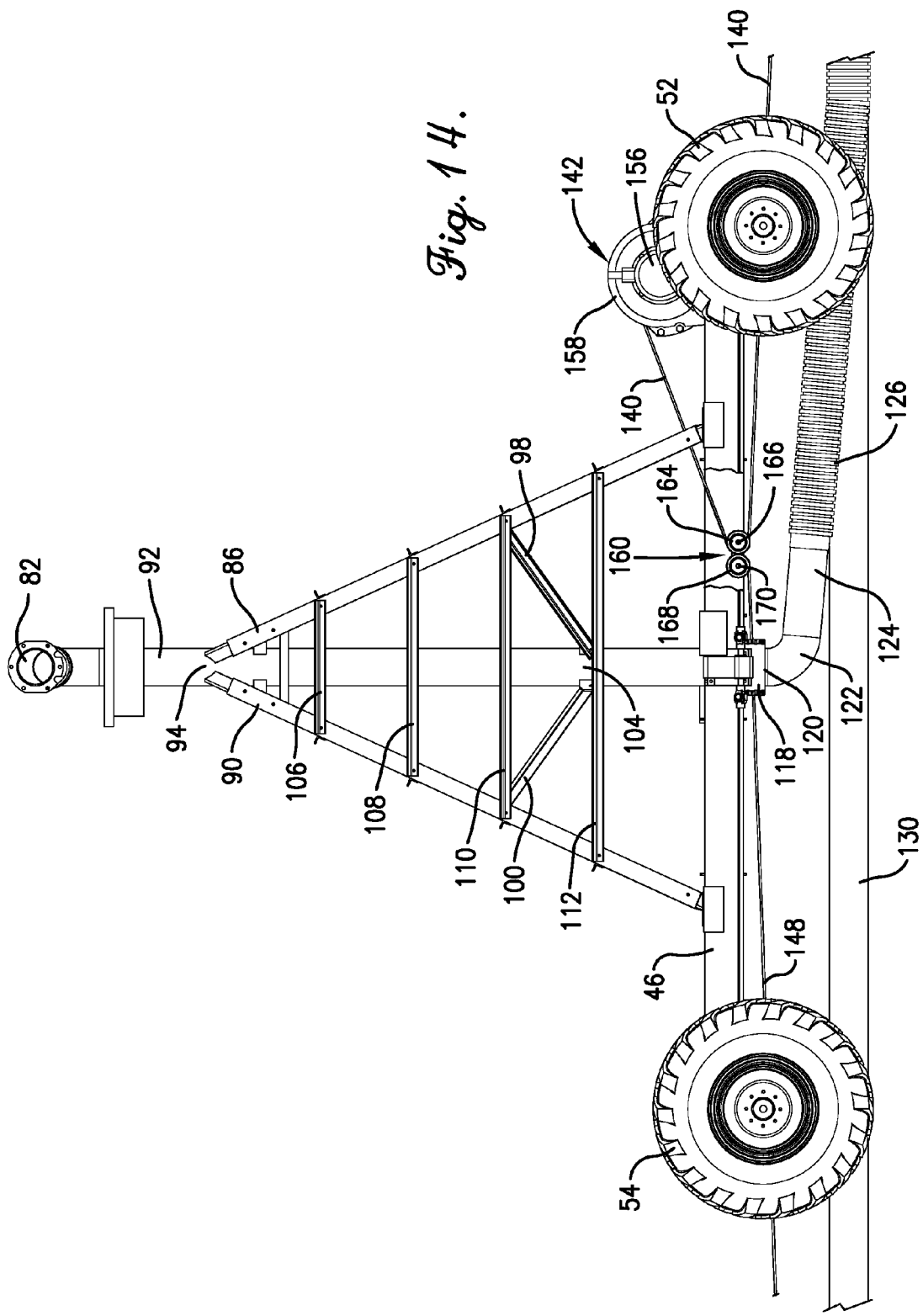
FIG. 14 is a right side view of a hose-fed lateral move irrigation system illustrated in FIG. 1, illustrating the cart.

The cart 22 continues to perform the travel cycle until it reaches an end of the cart path 24, at which point the flexible and rigid hoses 126, 130, 132, 134, 136 are fully extended and substantially straight, as illustrated in FIGS. 6 and 7. The cart 22 is then reversed along the cart path 24 causing the cart 22 to travel over and straddle the flexible and rigid hoses 126, 130, 132, 134, 136 between the wheels 40, 42, 44,46 with the distribution pipe 82 irrigating crops 28 adjacent to the cart 22 a second time, as illustrated in FIGS. 11 and 13. As the cart 22 departs the end of the cart path 24 and begins to drag the first flexible hose 126 to an opposite end of the cart path 24 and back to the starting point, a bend in the first flexible hose 126 is formed, which results in a 180 degree loop of the first flexible hose 126, and causes the coupler 122 to be subjected a compression force. Due to the two ft. minimum-bend diameter of the first flexible hose 126, the bend and resultant loop in the first flexible hose 126 is maintained between the wheels 40, 42, 44, 46 of the cart 22.

As the cart 22 progresses back toward the starting point at the opposite end of the cart path 24, the compression force causes the coupler 122 to swivel in a direction of the compression force while the bend in the first flexible hose 126 travels along the first flexible hose 126 at a rate essentially equal to a rate the cart 22 is traveling. As such, the bend generally remains in a fixed position with respect to the cart path 24 for a period of travel of the cart 22.

When the cart 22 is approximately six to eight ft. past the bend in the first flexible hose 126, the bend meets a point of engagement between the first flexible hose 126 and the first rigid hose 130. When the bend begins to travel along the first rigid hose 130, the first flexible hose 126 becomes substantially straight and the first rigid hose 130 bends in a 180 degree loop. Due to the fourteen ft. minimum-bend diameter of the first rigid hose 130, the bend and resultant loop in the first rigid hose 130 increases in diameter and extends substantially beyond the width of the cart 22 and wheels 40, 42, 44, 46. Because the loop, at this point, is well behind the cart 22, as illustrated in FIGS. 11 and 13, the loop is not problematic to the lateral move apparatus 20.

As the cart 22 nears the opposite end of the cart path 24, the flexible and rigid hoses 126, 130, 132, 134, 136 become substantially straight and the coupler 122 has swiveled 180 degrees on a hydrant 34 side of the cart 22. When the cart 22 reaches the opposite end of the cart path 24 and comes to a stop, the flexible and rigid hoses 126, 130, 132, 134, 136 have no slack and the likelihood of kinking is decreased.

The hydrant 34 has a stationary connector for connection to the third flexible hose 136. It is foreseen, however, the hydrant 34 may have a swiveling connector that swivels 180 degrees and the hydrant 34 may be connected to a rigid hose so that as the cart 22 pulls the rigid hose from one side of the hydrant 34 to the other, the hydrant 34 swivels in a direction of the cart 22 to decrease the likelihood of kinking.

Figure 15:
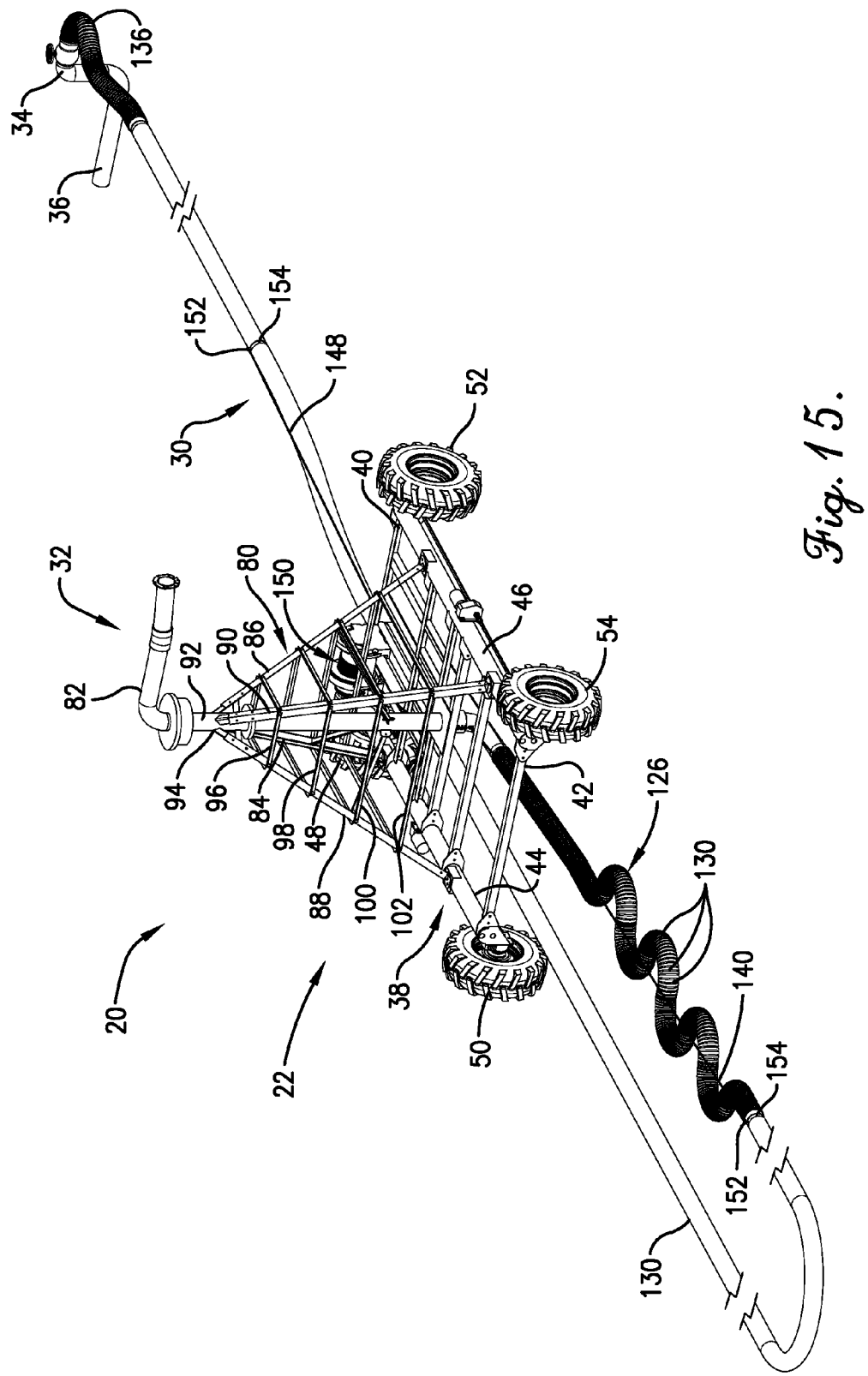
FIG. 15 is a rear right side perspective view of a hose-fed lateral move irrigation system in accordance with another embodiment of the present invention, illustrating a cart connected to a hydrant via a rigid hose and flexible hoses.
Figure 16:
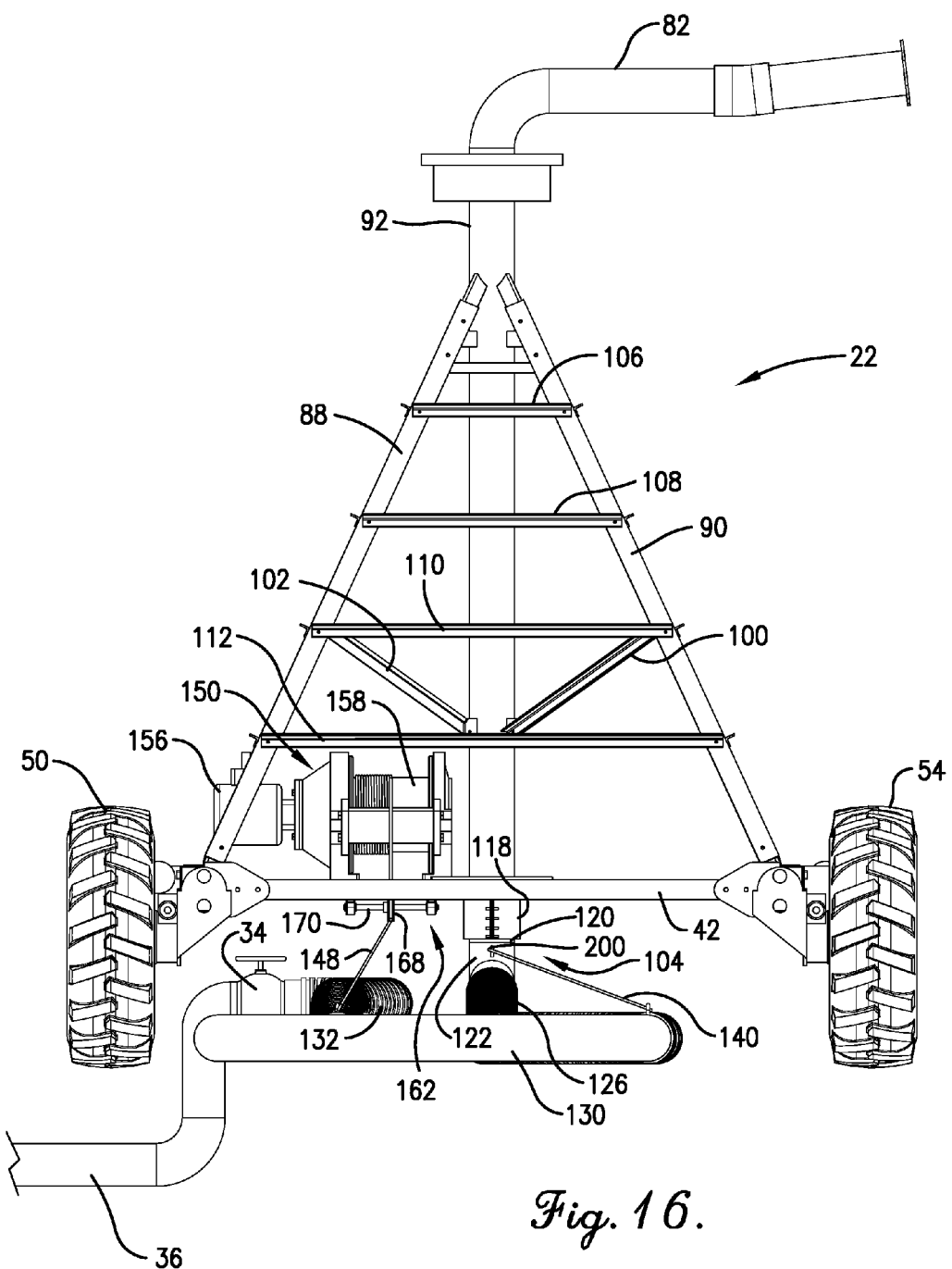
FIG. 16 is a rear view of a hose-fed lateral move irrigation system illustrated in FIG. 15, illustrating the cart connected to a hydrant via the rigid hose and the flexible hoses.
Figure 17:
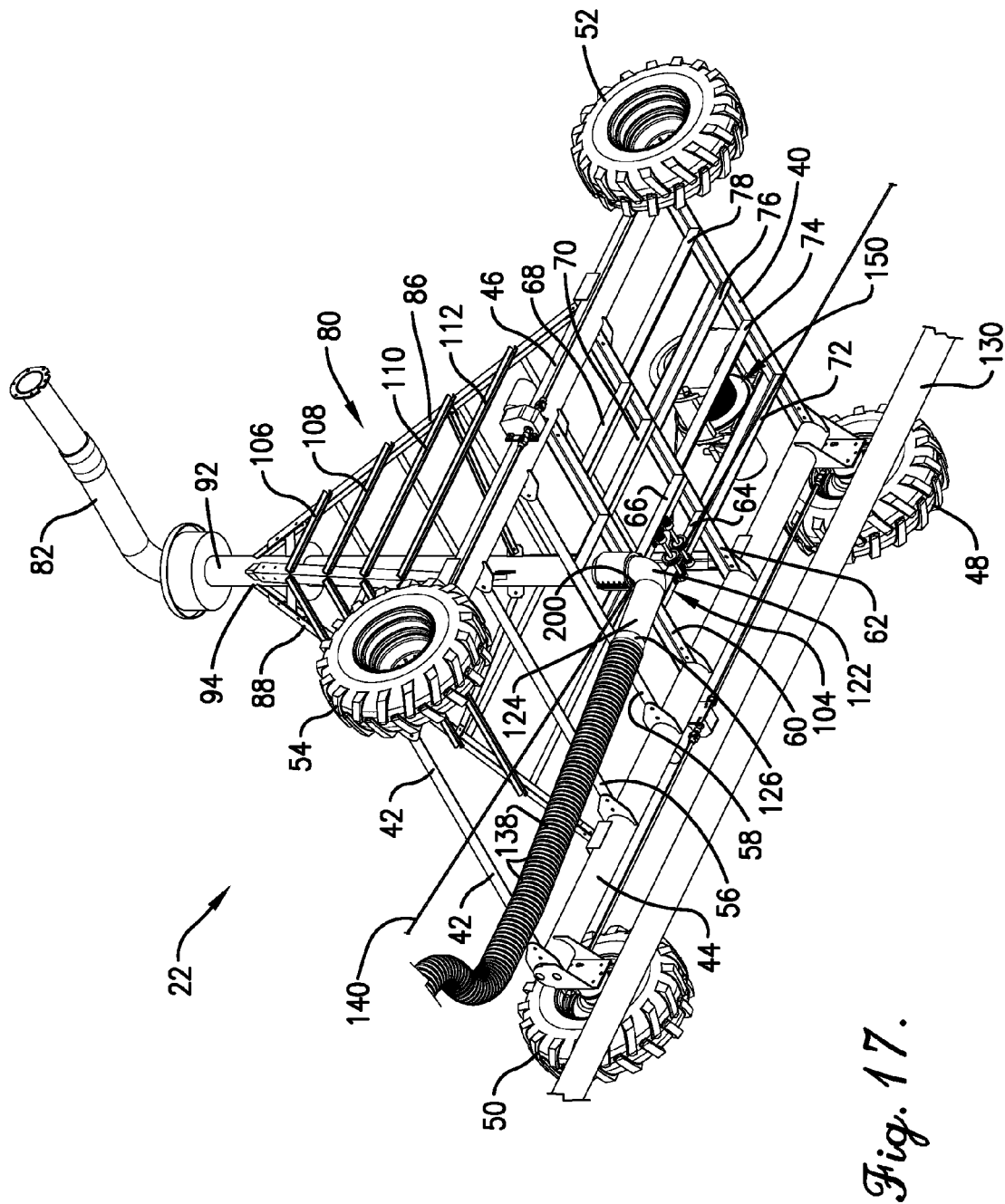
FIG. 17 is a bottom right-side perspective view of the cart illustrated in FIG. 15, illustrating cable-tensioning mechanisms.

Another embodiment of the present invention is illustrated in FIGS. 15-17. In this embodiment, a cart, such as cart 22, is connected to a first flexible hose, such as first flexible hose 126, the first flexible hose 126 is connected to a rigid hose, such as rigid hose 130, the rigid hose 130 is connected to a second flexible hose, such as second flexible hose 132, and the second flexible hose 132 is connected to a hydrant, such as hydrant 34.

The cart 22 is connected to the rigid hose 130 via cables, such as first and second external cables 140, 148, at two locations along the rigid hose 130 that define two portions of the rigid hose 130. The first external cable 140 is sized to extend along the entire length of the first flexible hose 126 and connects along the rigid hose 130 at a location adjacent to the connection between the rigid hose 130 and the first flexible hose 126. The second external cable 148 is sized to extend along the entire length of the first flexible hose 126 and approximately halfway along the length of the rigid hose 130 to connect at an approximate middle of the rigid hose 130.

The first and second external cables 140, 148 respectively connect to collars on the rigid hose 130, such as collars 146, 154. As in the exemplary embodiment, the collars 146, 154 may be rotatable about the rigid hoses 130 to expose eyelets, such as eyelets 144, 152, that are respectively fastened to the collars 146, 154. In this manner, connections between the first and second external cables 140, 148 and the rigid hose 130 are facilitated without requiring substantial movement of the rigid hose 130.

The first external cable 140 directly connects to the cart 22 below a pivot point such as pivot point 120 and at a coupler, such as elbow coupler 122, so that the first external cable 140 is operable to pull the elbow coupler 122 in a direction of the first external cable 140. The second external cable 148 indirectly connects to the cart 22 at a winch that is mounted on the cart 22, such as winch 150. In this manner, the cart 22 is operable to directly displace or pull a portion of the rigid hose 130 when the cart 22 moves and indirectly displace or pull another portion of the rigid hose 130 via the winch 150 when the cart 22 is at rest without any or only minimal transfer of pull force between the different portions of the rigid hose 130, which is instead entirely or mostly transferred to the cart 22 via the first and second external cables 140, 148.

The cart 22 in the another embodiment is used essentially the same as in the exemplary embodiment with the exception of the movement of the flexible and rigid hoses 126, 130 and the winch 150. In the another embodiment, the cart 22 is positioned in the starting position at the end of the cart path 24, as detailed in the exemplary embodiment, with the hydrant 34 spaced therefrom and the flexible and rigid hoses 126, 130, 136 aligned between the cart 22 and the hydrant 34. The hydrant 34 is activated so that fluid travels through the fluid-receiving section 30 and fluid-dispensing section 32 to the crops 28 for irrigation thereof. The cart 22 then begins to travel forward from the starting point at a predetermined rate with the distribution pipe 82 irrigating crops 28 adjacent to the cart 22. The cart 22 travels forward for a predetermined distance while pulling the flexible hose 126 and the portion of the rigid hose 130 with the first external cable 140 while the portion of the rigid hose 130 connected to the second external cable 148 and the flexible hose 136 remain entirely or at least substantially unaffected and at rest. In this embodiment, the predetermined distance is six inches to ten feet and is preferably one foot.

When the cart 22 has traveled the predetermined distance with the flexible hose 126 and the portion of the rigid hose 130 at the first external cable 140, the cart 22 stops moving and the winch 150 activates to drag the portion of rigid hose 130 connected to the second external cable 148 toward the cart 22 the same distance the cart 22 just traveled, i.e., the predetermined distance, which causes the portion of the rigid hose 130 connected to the first external cable 140 to obtain slack. When the portion of the rigid hose 130 connected to the winch 150 has been dragged the predetermined distance, the winch 150 deactivates to end a travel cycle of the lateral-move apparatus. The cart 22 then travels forward the predetermined distance and the travel cycle is repeated until the cart 22 reaches a predetermined point along the path 24 where the portion of the rigid hose 130 connected to the winch 150 is straight or substantially straight.

After the cart 22 passes the predetermined point and the portion of the rigid hose 130 connected to the winch 150 is straight or substantially straight, the cart 22 continues to travel forward while pulling the portion of the rigid hose 130 connected directly to the cart 22 via the first external cable 140 until it is straight or substantially straight. In this manner, portions of the rigid hose 130 are alternately moved independent from each other until the rigid hose 130 is straight or substantially straight.

As in the exemplary embodiment, the winch 150 performs its operation while the cart 22 anchors the cart 22 in a fixed position on the cart path 24. Thus, the maximum size of the rigid hose 130 is determined by the ability of the cart 22 to pull the portion of the rigid hose 130 via the first external cable 140, and pull the portion of the rigid hose 130 via the second external cable 148 and the winch 150 while maintaining its position on the cart path 24. The cart 22 and the winch 150 alternately pull portions of the rigid hose 130, respectively, so that the pull force of the portions of the rigid hose 130 is exerted upon the cart 22 and the winch 150 independent from each other, which enables the cart 22 to pull a larger rigid hose 130. It is foreseen that weights may be added to the cart 22 to increase the anchor ability of the cart 22 by increasing the weight of the cart 22.

The cart 22 continues to perform the travel cycle until it reaches an end of the cart path 24, at which point the flexible and rigid hoses 126, 130, are fully extended and substantially straight. The cart 22 is then reversed along the cart path 24 causing the cart 22 to travel over and straddle the flexible and rigid hoses 126, 130, 136 between the wheels 40, 42, 44, 46 with the distribution pipe 82 irrigating crops 28 adjacent to the cart 22 a second time, as illustrated in FIG. 15. As the cart 22 departs the end of the cart path 24 and begins to drag the rigid hose 130 to an opposite end of the cart path 24 and back to the starting point, a bend in the rigid hose 130 is formed, which results in a 180 degree loop of the rigid hose 130, and causes the coupler 122 to be subjected a compression force. Due to the two ft minimum-bend diameter of the first flexible hose 126, the bend and resultant loop in the first flexible hose 126 is maintained between the wheels 40, 42, 44, 46 of the cart 22.

As the cart 22 progresses back toward the starting point at the opposite end of the cart path 24, the compression force causes the coupler 122 to swivel in a direction of the compression force while the bend in the first flexible hose 126 travels along the first flexible hose 126 at a rate essentially equal to a rate the cart 22 is traveling. As such, the bend generally remains in a fixed position with respect to the cart path 24 for a period of travel of the cart 22.

When the cart 22 is approximately six to eight ft. past the bend in the first flexible hose 126, the bend meets a point of engagement between the first flexible hose 126 and the first rigid hose 130. When the bend begins to travel along the rigid hose 130, the first flexible hose 126 becomes substantially straight and the rigid hose 130 bends in a 180 degree loop. Due to the fourteen ft. minimum-bend diameter of the rigid hose 130, the bend and resultant loop in the rigid hose 130 increases in diameter and extends substantially beyond the width of the cart 22 and wheels 40, 42, 44, 46. Because the loop, at this point, is well behind the cart 22, as illustrated in FIGS. 11 and 13, the loop is not problematic to the lateral move apparatus 20.

As the cart 22 nears the opposite end of the cart path 24, the flexible and rigid hoses 126, 130, become substantially straight and the coupler 122 has swiveled 180 degrees on a hydrant 34 side of the cart 22. When the cart 22 reaches the opposite end of the cart path 24 and comes to a stop, the flexible and rigid hoses 126, 130, 136 have no slack and the likelihood of kinking is decreased.

It is foreseen that the exemplary embodiment may be modified in view of the another embodiment without departing from the scope of the present invention. For instance, the first rigid hose 130 of the exemplary embodiment may be replaced with the rigid hose 130 of the another embodiment (i.e., a rigid hose of approximately twice the length), a third external cable (not illustrated) may be added and connected as in the another embodiment (i.e., between a portion of the rigid hose 130 and the coupler 122), and the first external cable 140 of the exemplary embodiment may be connected to the rigid hose 130 in an approximate middle thereof. In this manner, the cart 22 would be operable to alternately and independently pull (I) a portion of the rigid hose 130 directly via the third external cable (not illustrated) when the cart 22 is moving along the cart path 24, (ii) another portion of the rigid hose 130 with the first external cable 140 and first winch 142 when the cart 22 is not moving along the cart path, and (iii) the second rigid hose 154 with the second external cable 148 and second winch 150 when the cart 22 is not moving along the cart path. Thus, the pull force required to move the flexible and rigid hoses 126, 130, 132, 134 are evenly distributed to the cart 22 and the winches 142, 150. It is also foreseen that additional winches, each with an external cable connected to a flexible or rigid hose to displace another portion of the flexible or rigid hose, may be may be added to the cart 22 without deviating from the scope of the present invention.

The embodiments of the present invention described above are to be used as illustration only, and should not be utilized in a limiting sense in interpreting the scope of the present invention. Obvious modifications to the embodiments, as hereinabove set forth, could be readily made by those skilled in the art without departing from the spirit of the present invention. For instance, those skilled in the art will appreciate that the principles of the present invention are not limited to use with a lateral-move irrigation system, but may be employed with other types of irrigation systems.

The inventors hereby state their intent to rely on the Doctrine of Equivalents to determine and assess the reasonably fair scope of the present invention as pertains to any apparatus not materially departing from but outside the literal scope of the present invention as set forth in the following claims.

What is claimed is:

1. An irrigation system having a liquid conduit for the delivery of liquid, the system comprising: a movable cart having a plurality of wheels; a flexible-hose assembly including a first flexible hose, a first rigid hose, a second flexible hose, and a second rigid hose connected to the movable cart in that order, the first flexible hose and the second flexible hose each defining an expansion-compression zone and each being operable to expand and compress within its expansion-compression zone to enable (i) movement of the cart without movement of the rigid hose, and (ii) independent alternating movement of the first rigid hose and the second rigid hose without any transfer of force therebetween; and a hose-displacement assembly including a plurality of winches each having a cable connected to the flexible-hose assembly at specific attachment points, the attachment points being spaced from each other along the flexible-hose assembly, wherein the first attachment point being positioned on the first rigid hose, the second attachment point being positioned on the second ridge hose; the plurality of winches being operable to pull the flexible-hose assembly in an alternating manner relative to each other, the hose-displacement assembly being mounted on the movable cart and secured to the flexible-hose assembly.

2. The irrigation system as claimed in claim 1 wherein the plurality of winches includes a first winch with a first cable having a length equal to a length of the first flexible hose and a second winch with a second cable having a length equal to a length of the first flexible hose and the first rigid hose.

3. A method of traversing a field with an irrigation system having a liquid conduit, the method comprising the steps of: providing a movable cart having a plurality of wheels; connecting a flexible-hose assembly to the movable cart that is operable to provide a portion of the liquid conduit, the flexible-hose assembly including a first flexible hose, a first rigid hose, a second flexible hose, and a second rigid hose connected to the movable cart in that order, the first flexible hose and the second flexible hose each defining an expansion-compression zone and each being operable to expand and compress within its expansion-compression zone to enable (i) movement of the cart without movement of the rigid hose, and (ii) independent alternating; movement of the first rigid hose and the second rigid hose without any transfer of force therebetween; mounting a hose-displacement assembly to the movable cart that is secured to the flexible-hose assembly, and operable to displace the flexible-hose assembly; and pulling the flexible hose assembly in an alternating manner using a plurality of winches each having a cable connected to the flexible-hose assembly at specific attachment points, the attachment points spaced from each other along the flexible-hose assembly, wherein the first attachment point being positioned on the first rigid hose, the second attachment point being positioned on the second ridge hose.

4. The method as claimed in claim 3, wherein the plurality of winches includes a first winch with a first cable having a length equal to a length of the first flexible hose and a second winch with a second cable having a length equal to a length of the first flexible hose and the first rigid hose.

* * * * *